United States Patent
Bhalla et al.

(10) Patent No.: US 9,483,338 B2
(45) Date of Patent: Nov. 1, 2016

(54) NETWORK NODE FAILURE PREDICTIVE SYSTEM

(71) Applicant: Accenture Global Services Limited, Dublin (IE)

(72) Inventors: Anuj Bhalla, Lake Hopatcong, NJ (US); Madan Kumar Singh, Bangalore (IN); Christopher Scott Lucas, Denver, CO (US); Ravi Teja, Bangalore (IN); Sachin Sehgal, Gurgaon (IN); Mayank Kant, Bangalore (IN); Sonal Bhutani, Bangalore (IN)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 181 days.

(21) Appl. No.: 14/536,033

(22) Filed: Nov. 7, 2014

(65) Prior Publication Data

US 2015/0135012 A1 May 14, 2015

Related U.S. Application Data

(60) Provisional application No. 61/902,078, filed on Nov. 8, 2013.

(51) Int. Cl.
*G06F 11/00* (2006.01)
*G06F 11/07* (2006.01)
(Continued)

(52) U.S. Cl.
CPC ............ *G06F 11/0751* (2013.01); *G06N 5/04* (2013.01); *G06N 99/005* (2013.01);
(Continued)

(58) Field of Classification Search
CPC ............ G06F 11/008; G06F 11/0751; G06F 11/0709; G06F 11/3452
See application file for complete search history.

(56) References Cited

U.S. PATENT DOCUMENTS 5,919,267 A * 7/1999 Urnes ................. G06F 11/0736
714/26
6,249,883 B1 * 6/2001 Cassidy ................ G06F 11/008
714/42

(Continued)

FOREIGN PATENT DOCUMENTS

EP 2469757 A1 6/2012
WO 2009/019691 A2 2/2009
WO 2012/151198 A1 11/2012

OTHER PUBLICATIONS

IP Australia, "Patent Examination Report No. 1" on Australia Patent Application No. 2014259538, dated Dec. 15, 2014, 4 pages.
(Continued)

*Primary Examiner* — Charles Ehne
(74) *Attorney, Agent, or Firm* — Mannava & Kang, P.C.

(57) ABSTRACT

In an example, network node failures may be predicted by extracting performance metrics for the network nodes from a plurality of data sources. A fail condition may be defined for the network nodes and input variables related to the fail condition for the network nodes may then be derived from the extracted performance metrics. A plurality of models may then be trained to predict the fail condition for the network nodes using a training set from the extracted performance metrics with at least one of the identified input variables. Each of the plurality of trained models may be validated using a validation set from the extracted performance metrics and may be rated according to predefined criteria. As a result, a highest rated model of the validated models may be selected to predict the fail condition for the network nodes.

20 Claims, 8 Drawing Sheets

(51) Int. Cl.
*G06N 5/04* (2006.01)
*G06N 99/00* (2010.01)
*G06F 11/34* (2006.01)
*H04L 12/24* (2006.01)

(52) U.S. Cl.
CPC ........ *H04L 41/0631* (2013.01); *H04L 41/147* (2013.01); *G06F 11/008* (2013.01); *G06F 11/0709* (2013.01); *G06F 11/3452* (2013.01); *H04L 41/16* (2013.01)

(56) References Cited

U.S. PATENT DOCUMENTS

| | | | |
|---|---|---|---|
| 6,353,902 B1 | 3/2002 | Kulatunge et al. | |
| 7,509,537 B1* | 3/2009 | Jensen | G05B 23/0229 714/47.2 |
| 7,747,730 B1* | 6/2010 | Harlow | H04L 12/2697 709/202 |
| 8,311,863 B1* | 11/2012 | Kemp | G06Q 10/0639 705/7.11 |
| 2008/0250265 A1 | 10/2008 | Chang et al. | |
| 2009/0047943 A1 | 2/2009 | Araki | |
| 2010/0049676 A1 | 2/2010 | Devitt et al. | |
| 2012/0066358 A1* | 3/2012 | Hobbs | H04L 41/20 709/222 |
| 2013/0121175 A1 | 5/2013 | Carlin et al. | |
| 2013/0238534 A1 | 9/2013 | Nagaraj et al. | |
| 2015/0254125 A1* | 9/2015 | Kakui | G06F 11/0709 714/47.3 |

OTHER PUBLICATIONS

European Patent Office, "Extended European search report", European Patent Application No. 14192262.5-1862, dated Mar. 18, 2015, 7 pages.

* cited by examiner

500

|        | 1st Sep | 2nd Sep | 3rd Sep | 4th Sep | 5th Sep | 6th Sep |
|--------|---------|---------|---------|---------|---------|---------|
| Node 1 |         | Flagged | Deleted | Deleted | Deleted |         |
| Node 2 |         |         |         | Flagged | Deleted | Deleted |
| Node 3 |         | Flagged | Deleted | Deleted |         |         |

Fail Condition

NETWORK NODE FAILURE PREDICTIVE SYSTEM

PRIORITY

This application claims priority to U.S. provisional patent application Ser. No. 61/902,078, filed on Nov. 8, 2013, which is incorporated by reference in its entirety.

BACKGROUND

Traditional communications network service providers (e.g., wireline service providers, cellular service providers, cable service providers, satellite service providers, etc.), application-specific service providers, and other types of providers face great competitive pressure to provide reliable and high-speed communication networks for their customers. Significant amounts of data and voice traffic, however, may be lost due to network failures. The network failures may include channel failures, link failures, and failures of network nodes such as hardware switches. Furthermore, determining the nature and the extent of the network failures may be difficult and costly. Therefore, these network failures may adversely impact the speed and reliability of the network.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
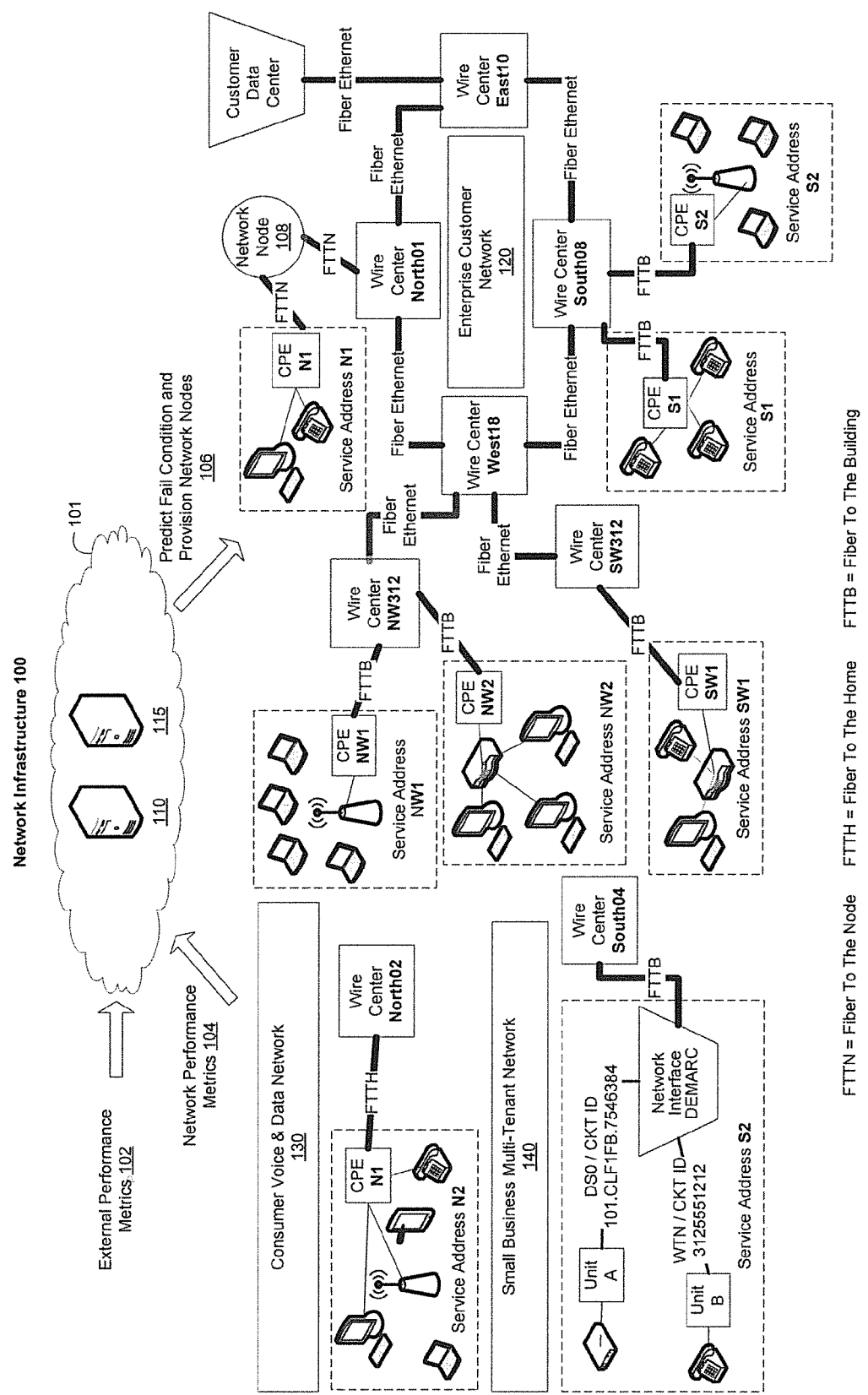
FIG. 1 shows a network infrastructure, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein are examples of a system for predicting network node failure in a network infrastructure. For example, a predictive analytics server of the present disclosure may predict or forecast which network nodes have a higher propensity to reach a fail condition as compared to other network nodes based on predictive analytics. As a result of the predictive analytics, for instance, a network administrator or network operations team may prioritize the maintenance of the network nodes and proactively resolve any issues related to the network nodes that are likely to fail, and thus minimize downtime for critical applications, customers of service providers, etc. Furthermore, the system, for example, includes a network provisioning subsystem to provision network nodes based on proactive failure prediction. Provisioning may include configuring network node parameters to provide needed bandwidth and accommodate quality of service (QoS) requirements for the services provided by the network nodes. According to an example, the provisioning subsystem may include distributed servers that determine and store configuration parameters determined for the network nodes. Moreover, the distributed servers may remotely set the parameters in the network nodes.

Predictive analytics refer to any approach to data mining with an emphasis on prediction (rather than description, classification or clustering), rapid time to insight (measured in minutes or hours), business relevance of the resulting insights, and ease of use, thus making the predictive analytics accessible to network providers. A network node may refer to any device that is a connection point in a network. For example, a network node may be a communication device that is capable of sending, receiving, or forwarding information over a communications channel in a network. In one example, the network node may perform a network function, such as a routing function performed by a network switch. An occurrence of a fail condition may be due to a communication device malfunction, battery malfunction, environment and sensor device malfunctions, etc. A network infrastructure may include a set of network nodes providing voice and data services over a network to customer premises. A service as used herein may include supplying or providing information over a network, and is also referred to as a communications network service. Examples of services include, but are not limited to, any voice, data, cable or satellite television, streaming audio or video, etc. provided over the network.

According to an example of the present disclosure, failure of network nodes in a network infrastructure may be predicted by extracting performance metrics for the network nodes from a plurality of data sources. The performance metrics, for example, may include telemetry data, customer data, call interaction data, and field technician data. A fail condition may then be defined for the network nodes. The fail condition, for instance, may be defined according to any measurable threshold relating to a communication device malfunction, battery malfunction, environment and sensor device malfunctions, etc. Input variables may be derived from the extracted performance metrics. The input variables, for instance, may be identified as relating to or impacting the fail condition. More specifically, the input variables may include predictor (i.e., independent) variables and a target (i.e., dependent) variable, such as the defined fail condition.

A plurality of models may be trained to predict the occurrence of the fail condition for the network node. The plurality of models refers to any predictive model that may be used to forecast a probability of an outcome such as, for example, a decision tree model, a neural network model, a logistic regression model, etc. The plurality of models may be trained using a training set from the extracted performance metrics, whereby each of the plurality of models is fit with at least one of the identified input variables. Training, for instance, refers to implementing the training set to fit (e.g. variable selection and parameter estimation) a model that is used to predict a target variable from one or more predictor variables. Each of the plurality of trained models may then be validated using a validation set from the extracted performance metrics. According to an example, each of the validated models may be rated according to predefined criteria to select the "best" model. The predefined criteria may include, but is not limited to, considerations of the predictive accuracy of each of the validated models, the interpretability of an output of each of the validated models, the efficiency of each of the validated models, the stability and robustness of each of the validated models, the scalability of each of the validated models, and the lift of each of the validated models.

Based on this rating, for example, a highest rated model (e.g., a "best model") may be selected to predict the occurrence of the fail condition for the network node. The predictive results of the selected model (e.g., the likelihood of the fail condition for each of the network nodes) may be used to prioritize a maintenance schedule for the network nodes. According to an example, the selected model may predict the occurrence of the fail condition at least 48 hours prior to the actual fail condition so that a network operations team may proactively fix the network node.

The examples of the present disclosure may bring clarity and consistency to a situation where a likely future behavior or condition of a network node is uncertain. That is, the examples may predict which network nodes are likely to fail and address them based on priority. Accordingly, the examples may provide network providers with an understanding of the future failure patterns of the network nodes and a likely load from certain customer groups or regions. By understanding these future failure patterns for the network nodes, network providers are better able to allocate investments to maximize returns, and thereby, reduce the cost of maintenance of the network nodes, improve the customer experience, and improve the life time of the network nodes in the network infrastructure.

Multiple technical problems associated with predicting network failure may be solved by the examples described herein. For example, a network provider may not have access to or the capacity to process a vast amount of data or information that is necessary to make an accurate prediction regarding a likelihood of failure for network nodes. This vast amount of data or information may be available from countless data sources. Additionally, the network infrastructure may include numerous network nodes that each requires a vast amount of individualized data or information from the countless data sources. The disclosed examples may accurately and effectively process and map together the vast data that is captured from thousands of different sources into a single version of the data capture. For example, a performance extractor of a predictive analytics server may capture the vast data from the different sources and map the data into a network node performance analytic record (NPAR). A model constructor of the predictive analytics server may then derive and select relevant input variables from the single source NPAR to train each of a plurality of models. In this regard, an accurate prediction of a network node failure may be attained using all the difference sources of data.

In another example, a network provider may not be able to account for the multiple reasons many network nodes which may fail. Failure of a network node, such as a co-axial cable switch, may happen for many reasons including non-controllable factors such as thunderstorms, cyclones, extreme weather conditions, accidents, etc. Other reasons for network node failure include technical problems such as poor specifications of the equipment, poor infrastructure, stolen bandwidth, etc. The examples disclosed herein may capture all these factors from a multitude of data sources into a predictive model, which may be used for predictive analytics.

Furthermore, a network provider may not be able to effectively perform predictive analytics on the vast data that is captured from thousands of different sources in approximately real-time. In this regard, an accurate prediction of a network node failure may not be attained far enough in advance of the actual failure of the network node. The predictive model of the disclosed examples may process the vast amount of data that is captured from thousands of different sources in approximately real-time to provide the network provider with a prediction of a network node failure at least 48 hours in advance. For example, a performance extractor of a predictive analytics server may capture the vast data from the different sources in and map the data into a (NPAR) in real-time. A model constructor of the predictive analytics server may then select input variables that are derived from the most current and updated data in NPAR to train each of a plurality of models. Accordingly, a forecasting engine of the predictive analytics server may input the most current variables into a predictive model to allow the predictive model to predict a fail condition far in advance of the actual fail condition. Moreover, a network provider may not need to dispatch as many technicians to as many network nodes as in conventional systems. That is, according to the disclosed examples, the predictive analysis server may able to capture approximately 35-40% of the failing network nodes by monitoring just 20% of the total network nodes. This means that a technician may be able to visit 20-45% of the network nodes in almost half the number visits required in conventional systems, which may leads to a reduction in costs of visits by almost 50-75%.

Additionally, a network provider may not able to account for the decay of accuracy in a predictive model. That is, the relationship between failure and the reasons for failure can change with time and may lead to a decay of accuracy of predictive model. The examples disclosed herein address the decay of accuracy of the predictive model by continually training and validating the predictive model using current data and information that is captured from thousands of different sources in approximately real-time.

Moreover, when predicting the fail condition for a network node, the network service provider must determine whether the services currently provided on the network infrastructure can be supported in terms of QoS and service level requirements for the services and the service provider must determine other predictive analysis parameters. According to the disclosed examples, a fail condition prediction plan may be devised to deploy services in the network infrastructure which minimize service disruption for customers and maximize the processing of the predictive analysis, as well as accommodate QoS and service level requirements for the services deployed in the network infrastructure. Another technical problem solved by the examples, is the configuration of network nodes in the network infrastructure. Typically, a network administrator may determine the network node parameters through use of spreadsheets and estimates of customer demand, and then manually configure the network nodes, which is highly susceptible to user error and can result in a service disruption for the customer. The provisioning subsystem can determine network nodes based on fail condition predictions and remotely configure the network nodes.

FIG. 1 shows a network infrastructure 100, according to an example of the present disclosure. The network infrastructure 100 may include a service provider network prediction system 101 that may include a predictive analytics server 110 and a provisioning server 115. The predictive analytics server 110 may, for example, aggregate external performance metrics 102 and network performance metrics 104 from a plurality of data sources, train a predictive model using the aggregated performance metrics, and run the predictive model to predict a fail condition 106 for network nodes in the network infrastructure 100 as discussed further below. The provisioning server 115, for instance, may remotely perform discovery and capture network parameters of existing network nodes in the network infrastructure 100 and remotely configure network nodes 106 in the network infrastructure 200. A network node 108 may be a switch that is external or internal to customer premise equipment (CPE) or a network interface demarcation point.

Accordingly, the network infrastructure 100 for example may be a fiber-based telecommunication network that includes network nodes in a packet-switched network. As discussed above, the network node 108 may include a path between two points or terminals in a network infrastructure for communicating signals and may comprise equipment including switches, wires, etc. The network infrastructure 100, for example, may use fiber lines for network nodes between wire centers and customer premises. A wire center may encompass the central office, hardware located inside and outside the central office and connections from the central office to the customer service address, which is the geographic address of the customer premises, such as house/building number, street, city, etc. The packet switched network for example uses Internet Protocol (IP), and may implement broadband services over the fiber lines that are connected to fiber-optic switches and nodes. Fiber may be run to a network node 108 for a neighborhood or region and to the service address. As shown in FIG. 1, FTTN=Fiber To The Node; FTTH=Fiber To The Home; and FTTB=Fiber To The Building.

The network infrastructure 100 for example includes enterprise customer network 120, consumer voice and data network 130, and small business multi-tenant network 140. The enterprise customer network 120 uses fiber Ethernet to connect the wire centers and to connect to the data center. FFTN, FTTB, and FTTH are used to connect to fiber nodes and CPE at the service address. The consumer voice and data network 130 may use FFTH to connect the wire center to the CPE at the service address, and the small business multi-tenant network 140 may use FTTB to connect the wire center to the multi-tenant building.

Figure 2A:
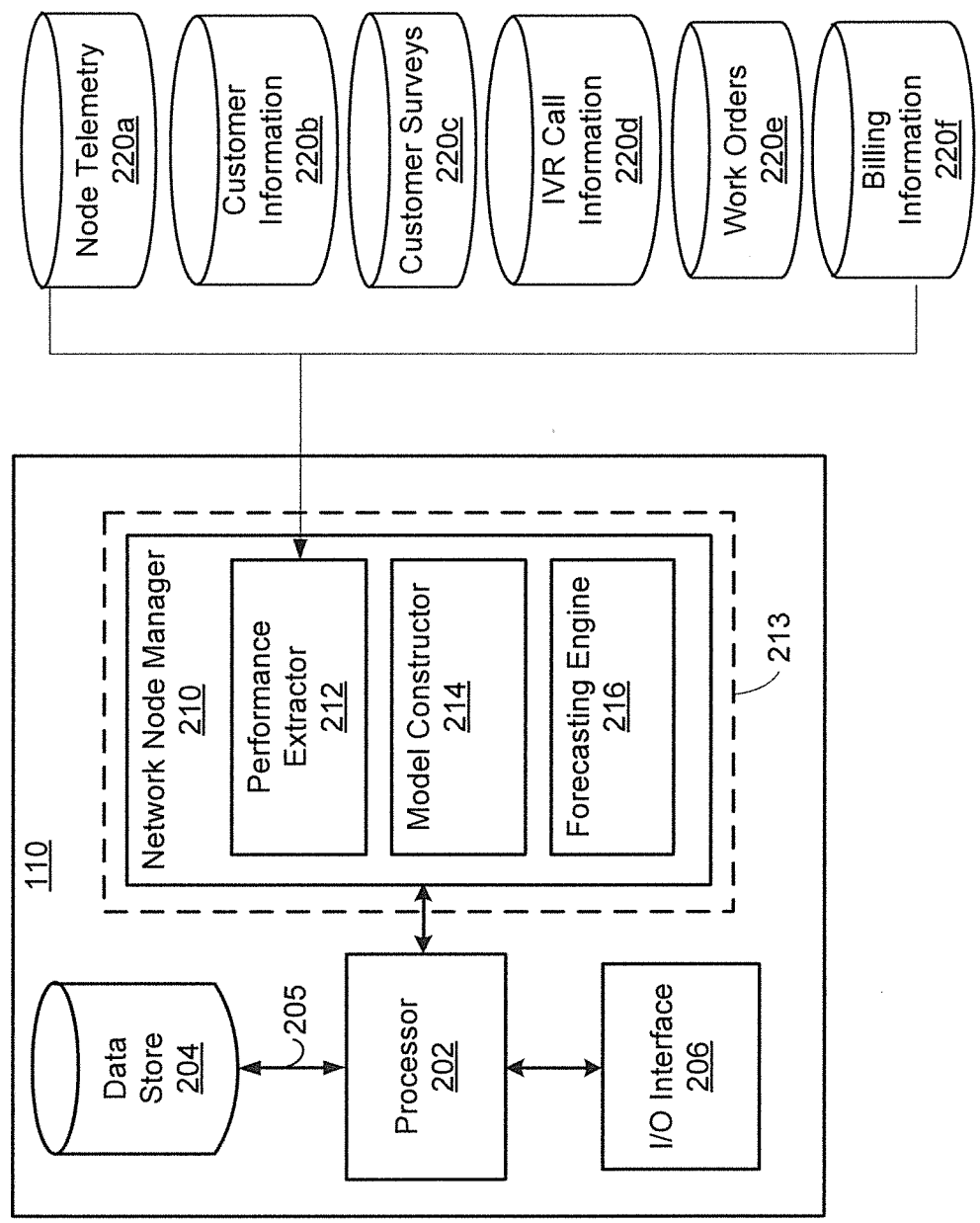
FIG. 2A shows a block diagram of a predictive analytics server, according to an example of the present disclosure.

With reference to FIG. 2A, there is shown a block diagram of a predictive analytics server 110, according to an example of the present disclosure. It should be understood that the predictive analytics server 110 may include additional components and that one or more of the components described herein may be removed and/or modified without departing from a scope of the predictive analytics server 110.

The predictive analytics server 110 is depicted as including a processor 202, a data store 204, an input/output (I/O) interface 206, and a network node manager 210. For example, the predictive analytics server 110 may be a desktop computer, a laptop computer, a smartphone, a computing tablet, or any other type of computing device. The predictive analytics server 110 may store or manage high-dimensional data in a separate computing device, for instance, through a network device, which may include, for instance, a router, a switch, a hub, and the like. The data store 204 may include physical memory such as a hard drive, an optical drive, a flash drive, an array of drives, or any combinations thereof, and may include volatile and/or non-volatile data storage. Although the predictive analytics server 110 is shown as a single server in FIG. 2A, the predictive analytics server 110 may be implemented by more than one server.

The processor 202, which may be a microprocessor, a micro-controller, an application specific integrated circuit (ASIC), or the like, is to perform various processing functions in the predictive analytics server 110. In an example, the network node manager 210 includes machine readable instructions stored on a non-transitory computer readable medium 213 and executable by the processor 202. Examples of the non-transitory computer readable medium 213 may include dynamic random access memory (DRAM), electrically erasable programmable read-only memory (EEPROM), magnetoresistive random access memory (MRAM), memristor, flash memory, hard drive, and the like. The computer readable medium 213 may be included in the data store 204 or may be a separate storage device. In another example, the network node manager 210 includes a hardware device, such as a circuit or multiple circuits arranged on a board. In this example, the network node manager 210 may be circuit components or individual circuits, such as an embedded system, an ASIC, or a field-programmable gate array (FPGA).

Figure 3:
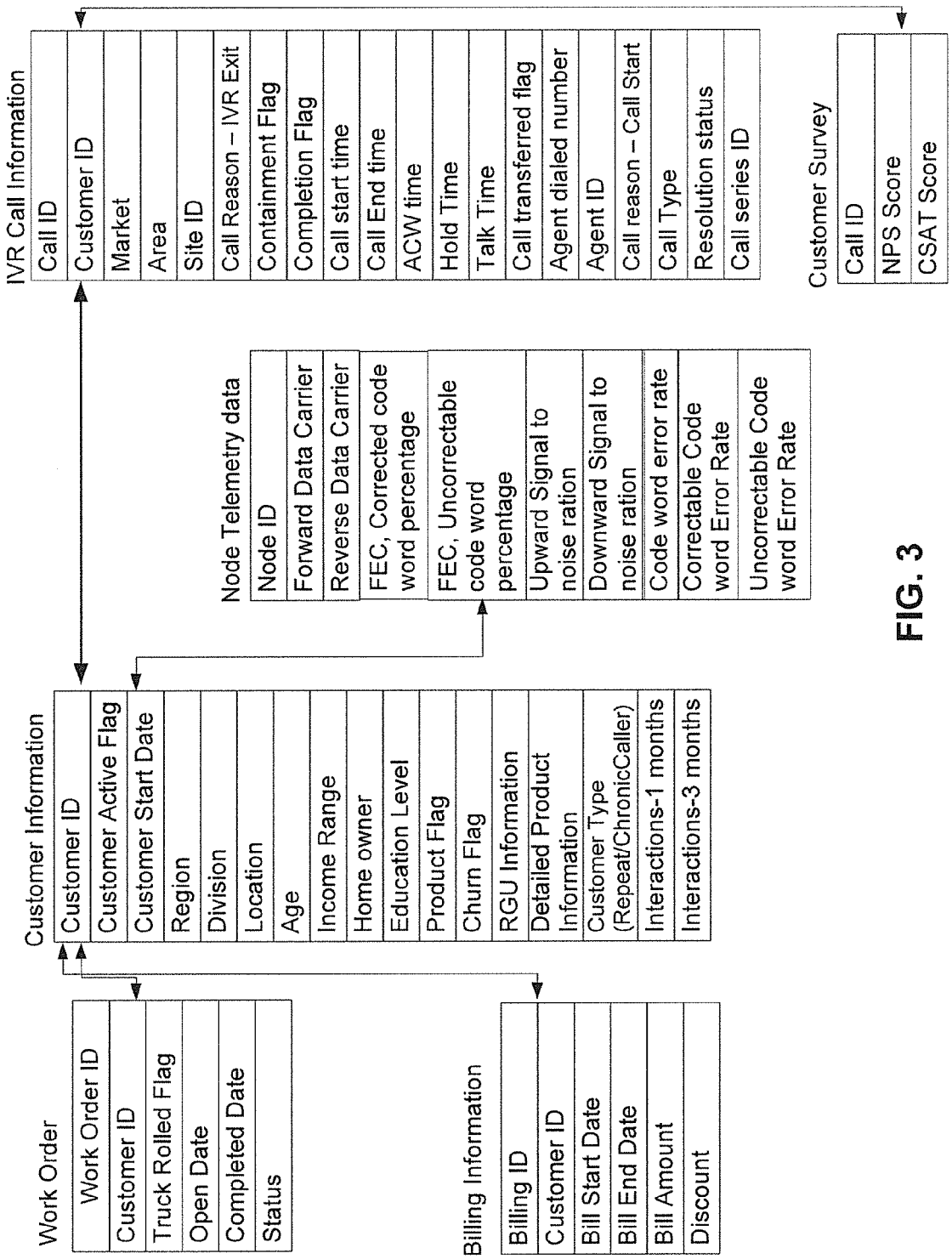
FIG. 3 shows a schematic diagram of performance metrics that may be aggregated from the plurality of data sources, according to an example of the present disclosure.

The processing functions of the network node manager 210 may include the functions of a performance extractor 212, a model constructor 214, and a forecasting engine 216. The performance extractor 212, for instance, may aggregate performance metrics for network nodes in the network infrastructure 100. The performance metrics may be aggregated from a plurality of data sources including, but not limited to, node telemetry data 220a, customer information 220b, customer surveys 220c, interaction voice response (IVR) call information 220d, work orders (e.g., field technician data) 220e, and billing information 220f. FIG. 3 shows a schematic diagram of examples of performance metrics that may be aggregated from the plurality of data sources. These performance metrics may be used by the performance extractor to create a network node performance analytic record (N PAR) for each of the network nodes.

Referring back to FIG. 2A, the model constructor 214, for instance, may identify input variables related to a fail condition for the network nodes, train a plurality of models to predict the fail condition for the network nodes using the identified input variables and a training set from the extracted performance metrics, and validate each of the plurality of trained models using a validation set from the extracted performance metrics. The forecasting engine 216, for instance, may define the fail condition for the network nodes, rate each of the validated models according to predefined criteria, implement a highest rated model of the validated models to predict the fail condition for the network nodes, and prioritize a maintenance schedule for the network nodes in the network infrastructure based on a predicted likelihood of the fail condition for each of the network nodes.

The processor 202 may be coupled to the data store 204 and the I/O interface 206 by a bus 205, where the bus 205 may be a communication system that transfers data between various components of the predictive analytics server 110. In examples, the bus 205 may be a Peripheral Component Interconnect (PCI), Industry Standard Architecture (ISA), PCI-Express, HyperTransport®, NuBus, a proprietary bus, and the like.

The I/O interface 206 includes a hardware and/or a software interface. The I/O interface 206 may be a network interface connected to a network through a network device, over which the network node manager 210 may receive and communicate information. For example, the I/O interface 206 may be a wireless local area network (WLAN) or a network interface controller (NIC). The WLAN may link the computing device 110 to a network device through a radio signal. Similarly, the NIC may link the predictive analytics server 110 to a network device through a physical connection, such as a cable. The predictive analytics server 110 may also link to a network device through a wireless wide area network (WWAN), which uses a mobile data signal to communicate with mobile phone towers. The processor 202 may store information received through the I/O interface 206 in the data store 204 and may use the information in implementing the network node manager 210. According to another example, the I/O interface 206 may be a device interface to connect the predictive analytics server 110 to one or more I/O devices. I/O devices may include, for example, a display, a keyboard, a mouse, and a pointing device, wherein the pointing device may include a touchpad or a touchscreen. The I/O devices may be built-in components of the predictive analytics server 110, or located externally to the predictive analytics server 110. The display may be a display screen of a computer monitor, a smartphone, a computing tablet, a television, or a projector.

Figure 2B:
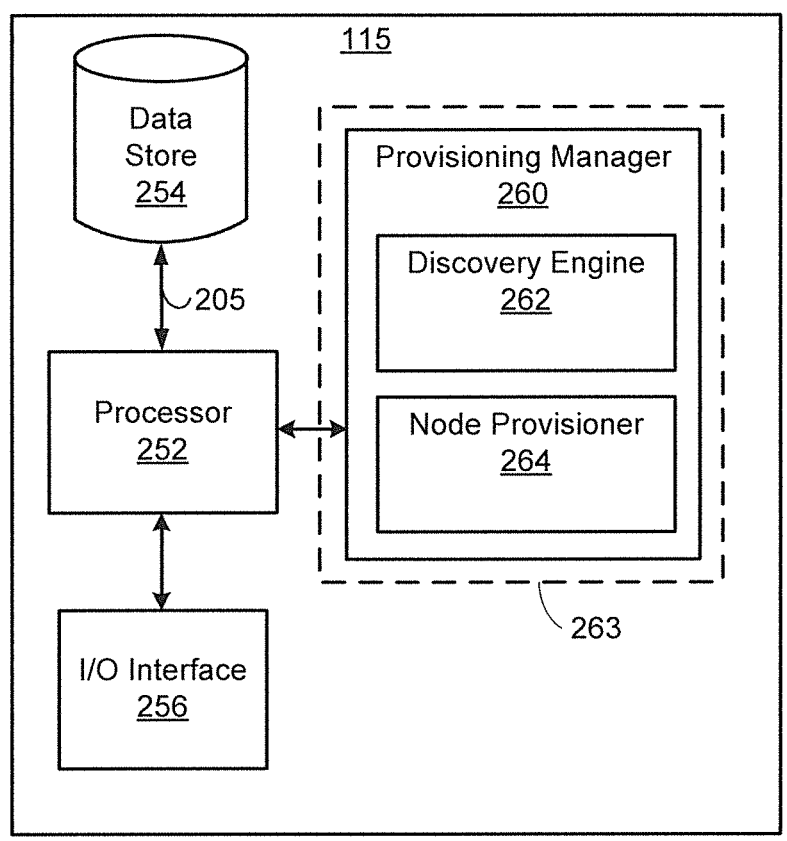
FIG. 2B shows a block diagram of a provisioning server, according to an example of the present disclosure.

With reference to FIG. 2B, there is shown a block diagram of a provisioning server 115, according to an example of the present disclosure. The provisioning server 115 is depicted as including a processor 252, a data store 254, an input/output (I/O) interface 256 as similarly described with respect to FIG. 2A. The provisioning server 115 may be implemented by more than one server. Additionally, the provisioning server 115 includes a provisioning manager 260. In an example, the provisioning server 115 includes machine readable instructions stored on a non-transitory computer readable medium 263 and executable by the processor 252.

The processing functions of the provisioning manager 260 may include the functions of a discovery engine 262 and a node provisioner 264. The discovery engine 262 may send queries to network nodes in the network infrastructure 100 to identify network nodes and determine network parameters for the network nodes. The parameters may include port information, circuit IDs for each port, network address information, service information, etc. Also, the network nodes may be queried to determine information related to the quality or a health of network node and generate alerts to network administrators if a network element is determined to be failing or operating in error. According to an example, the discovery engine 262 may receive a prediction of a fail condition for failing network nodes from the forecasting engine 216 of the predictive analytics server 110.

The node provisioner 262 may set network parameters for network nodes remotely so the network nodes perform the desired functions in the network infrastructure 100. In one example, a software defined networking (SDN) protocol is used to set network parameters. The node provisioner 262 may include a rich set of application program interfaces (APIs) that manage and manipulate network nodes. The network nodes may include software modules that can be remotely configured by the provisioning server 115 to perform the desired functions and set the desired network parameters in the network nodes, which may include automated provisioning of network addresses, assigning specific QoS and latency parameters, etc. According to an example, the node provisioner 262 may be alerted of the failing network nodes when receiving the network parameters of the failing network nodes from the discovery engine 262. In this regard, the node provisioner 262 may then remotely manage the failing network nodes using a network management tool, such as a simple network management protocol (SNMP), to modify or apply a new configuration to the parameters of the failing network nodes to fix the fail condition in advance of the actual occurrence of the fail condition. For example, in response to the alert, the node provisioner 262 may remotely assign specific QoS and latency parameters, reset a password, set a value for an object identifier, reconfigure an IP address, etc. to resolve the fail condition in the failing network nodes.

Figure 4:
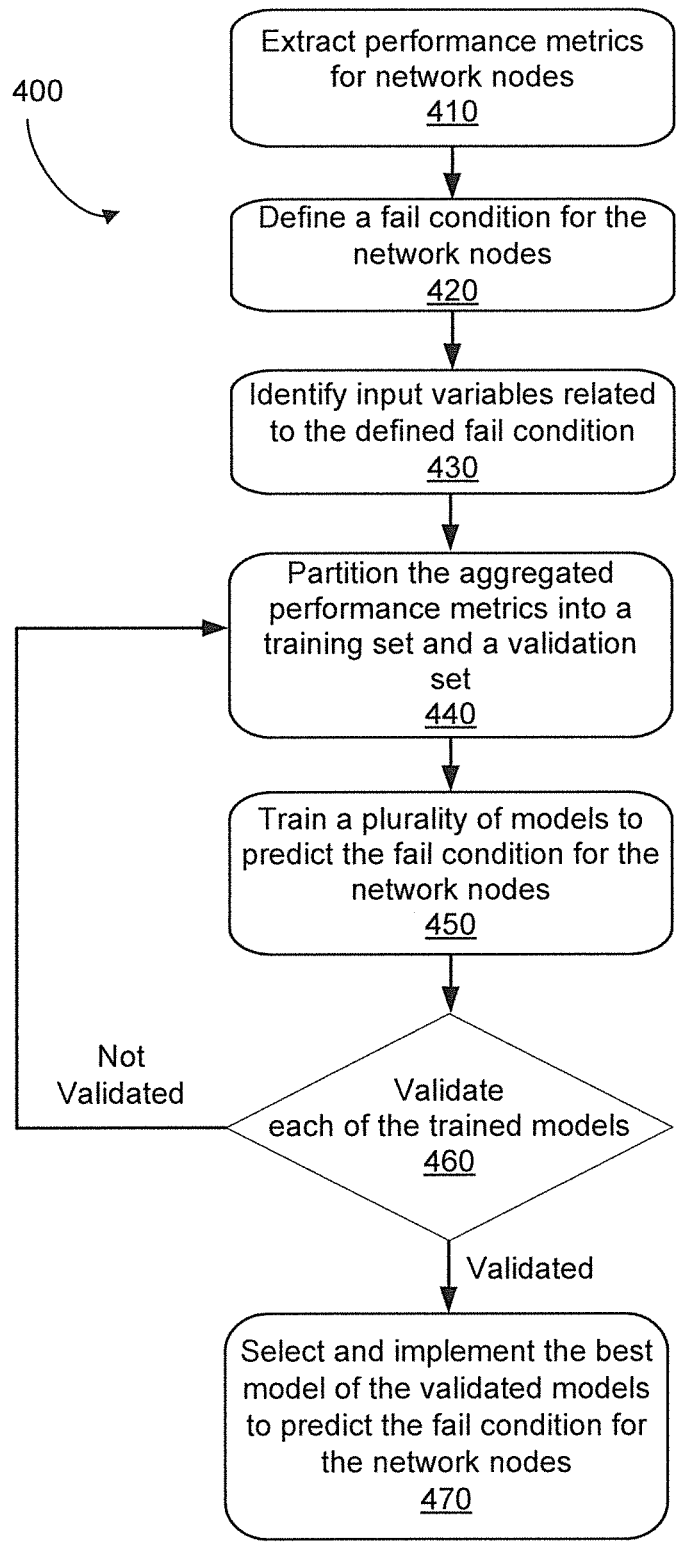
FIG. 4 shows a flow chart of a method for predicting a fail condition for a network node in a network infrastructure, according to an example of the present disclosure.

With reference to FIG. 4, there is shown a flow chart of a method 400 for predicting a fail condition for a network node in a network infrastructure, according to an example of the present disclosure. It should be apparent to those of ordinary skill in the art that method 400 represents a generalized illustration and that other operations may be added or existing operations may be removed, modified or rearranged without departing from the scope of method 400. The method 400 is implemented, for example, by the processor 202 of the predictive analytics server 110 as depicted in FIG. 2A.

At block 410, the performance extractor 212 of the predictive analytics server 110 may aggregate performance metrics for network nodes in the network infrastructure to create a network node performance analytic record (NPAR). For example, the created NPAR may be a dataset that includes all the necessary performance metrics to be input into a predictive model that is trained to forecast an occurrence of a fail condition for network nodes. According to an example, the performance extractor may aggregate performance metrics from a predetermined time frame at least 48 hours prior to an occurrence of the fail condition for the network nodes. In this regard, a fail condition for a selected network node may be predicted at least 48 hours in advance of the actual fail condition. The performance metrics in the NPAR may be divided by date (e.g., days) for each node to enable the performance metrics to be easily applied to model training.

The performance metrics for a network node, for instance, may be aggregated from a plurality of data sources such as node telemetry data, customer information, customer surveys, IVR call information, work orders (e.g., field technician data), and billing information, as shown in FIG. 3. The node telemetry data, for instance, may capture technical parameters for the network node such as signal-to-noise ratios (SNR), correctible and uncorrectable forward error corrections (FEC), forward data channels (FDC), return data channels (RDC), signal alarm counts, count of flux devices, and etc. The customer information may capture lifestyle segments of customers, product profile of customers, billing amounts of customers associated with the node, video-on-demand (VOD) orders by the customers, and etc. The IVR call information may capture the volume and increase in repair/technical calls made by customers for cable boxes, phone, and modems, and etc. The work orders information may capture the count of field technician orders opened and completed. Accordingly, the higher the number of field technician orders opened, the higher the chances of an issue at the network node.

At block 420, the forecasting engine 216 of the predictive analytics server 110, for instance, may define the fail condition for the network nodes. According to an example, the fail condition may be defined according to a performance threshold value or metric by which the network node is expected to operate in the network infrastructure. The performance extractor 212, for example, may record when a network node has reached the defined fail condition (i.e., does not reach its expected performance metric) and a reason for the fail condition.

Figure 5:
FIG. 5 shows a fail condition table in the network node performance analytics record, according to an example of the present disclosure.

In a disclosed example, an outage flag may be used to record the fail condition. Referring to FIG. 5, the performance extractor 212, for instance, may create a fail condition table 500 in the NPAR that tracks a fail condition history for each node (e.g., node 1, node 2, node 3, etc.) in the network infrastructure. The fail condition table 500 may be divided by day to enable the fail condition metrics to be easily applied to model training. According to an example, consecutive days where the fail condition is flagged in the fail condition table 500 may be deleted. In a real scenario, for example, a fail condition for a network node may remain consecutively for days. However, for predictive modeling, a prediction may be made only on the first day of the fail condition. Therefore, in the predictive model of a disclosed example, only the first day of every fail condition sequence is saved and consecutive days where the fail condition is flagged for each node may be deleted in the fail condition table 500. Accordingly, the performance extractor 212 may detect the occurrence of the fail condition for the network nodes, flag each day that the fail condition is detected for at least one of the network nodes, and remove a flag for each flagged day that is consecutive to a first flagged day.

At block 430 in FIG. 4, the model constructor 214 of the predictive analytics server 110, for instance, may identify input variables related to the fail condition for the network nodes. The input variables may be derived from the extracted performance metrics and fail condition metrics, which are included in the NPAR. According to an example, the input variables that are derived from the extracted performance metrics may include a minimum, maximum, or average value of different technical variables, a percent or proportion value based on total accounts attached to the network node (e.g., a percentage of set boxes with a signal alarm may be derived using a ratio of set boxes with signal alarm and total accounts), and a number of customer calls in a predetermined number of days. Furthermore, a flag variable may be defined for technical variables that show a step relationship with a failed condition. For example, in upstream SNR, the fail condition is high if this input variable is either below 33 or above 35. Therefore, for this input variable a flag variable may be created which takes a value of 1 if upstream SNR is between 33 and 35; and takes value 0 otherwise.

Once the input variables are derived, the model constructor 214 may select the input variables that are to be used in the plurality of predictive models. A variable clustering algorithm may be used to select a list of input variables for use in training the predictive models. The clustering algorithm may rank the list of input variables according to predefined criteria relating to their fit to a plurality of untrained predictive models. Based on the output of the variable clustering algorithm, the highest ranked input variables, for instance, may be chosen to train the predictive models. According to another example, the model constructor 214 may reduce the list of input variables by selecting only non-correlated input variables for use in training the predictive models.

At block 440, the model constructor 214, for instance, may partition the extracted performance metrics into a training set (e.g., 60-70%) for training a predictive model and a validation set (e.g., 30-40%) that is not used for training the predictive models. The extracted performance metrics may be partitioned using a random sampling algorithm. This partition ensures that the predictive models are trained accurately and fits the "true" relationship between the input variables as opposed to just fitting the characteristics of the training set of performance metrics. In this regard, for instance, the predictive models may be tested through a validation set. Therefore, to validate the accuracy and robustness of the predictive models, a validation set is reserved with approximately 30-40% of the performance metrics for example, which are not used for training the plurality of predictive models. In other words, once a predictive model is trained on the training set, the performance of the predictive model may be tested on the validation set to ensure that the predictive model is performing as well on the validation set as it did on the training set.

At block 450, the model constructor 214, for instance, may train the plurality of predictive models to predict the fail condition for the network nodes using the training set from the extracted performance metrics. The predictive models are fit with at least one of the identified input variables during the training process. The plurality of predictive models, for example, may include any statistical predictive model such as a decision tree model, a neural network model, a logistic regression model, etc. Each one of these different statistical predictive models may make different assumptions about the input variables and may have different rates of convergence. The statistical predictive model that works best (e.g., minimizes some cost function of interest, such as a fail condition rate) may be the one that makes assumptions that are consistent with the performance metrics and has sufficiently converged to its error rate.

Figure 6:
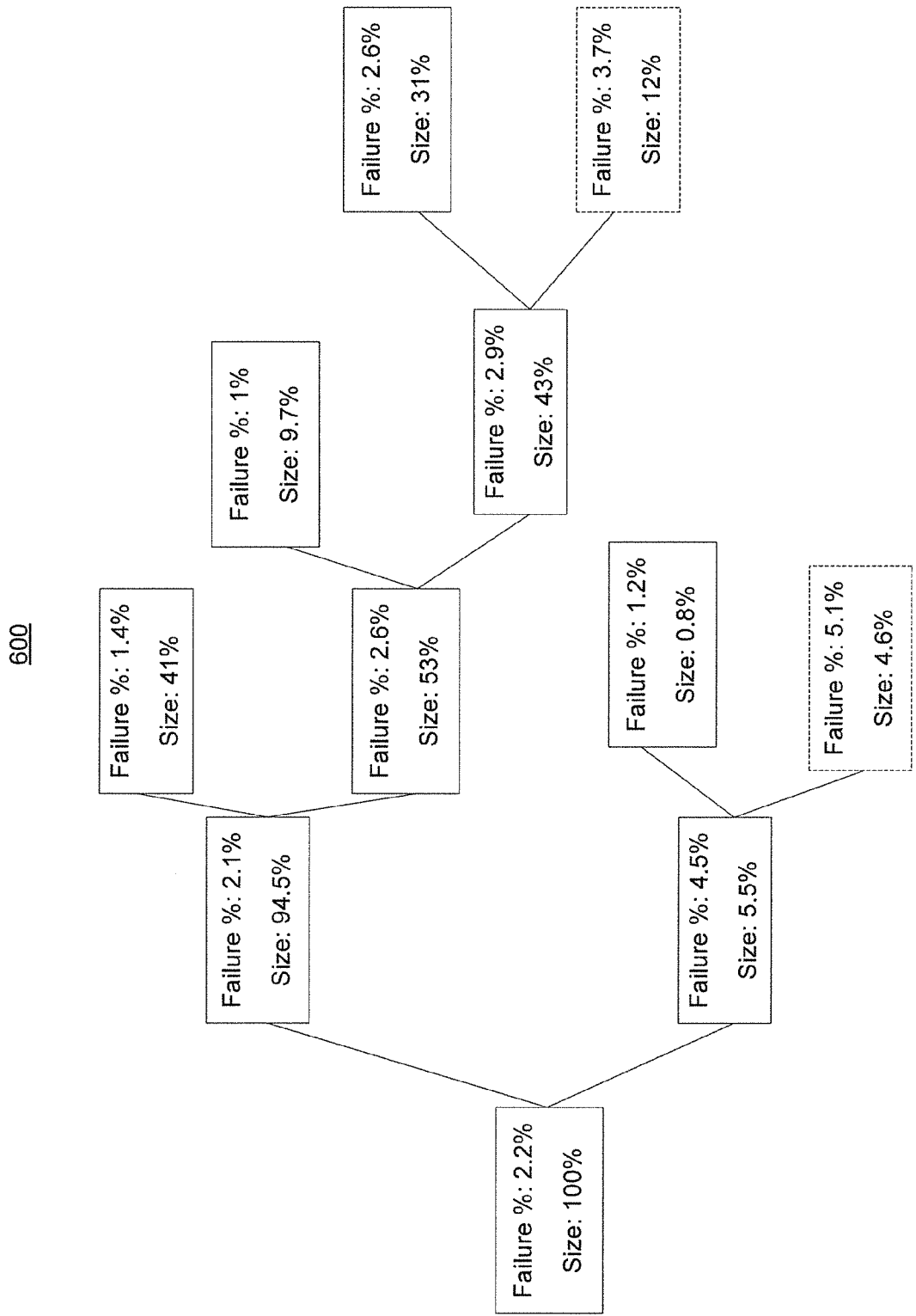
FIG. 6 shows a decision tree that is used to train a predictive model, according to an example of the present disclosure.

According to one example, the model constructor 214 may train a decision tree to predict the fail condition. A decision tree model is a decision support tool that uses a tree-like graph of decisions and their possible consequences, which include chance event outcomes, resource costs, and utility. A fail condition for a network node may be defined as a chance outcome and the decision tree may be used to identify input variables that may help identify the network nodes that are more likely to fail compared to other network nodes. As shown in FIG. 6, a decision tree model may be trained to identify certain combinations of the key variables which lead to higher node failure propensity. For example, decision tree nodes that are indicated with broken lines may have a higher failure rate as compared to an overall population. Thus, the two decision tree nodes that are indicated with broken lines in FIG. 6 may be prioritized for maintenance as further discussed below.

According to another example, the model constructor 214 may train a neural network model to predict the fail condition. A neural network model may be implemented where a highly nonlinear approach is required to sift through the plethora of available performance metrics. A neural network model is not based on "a priori" assumptions and allows a detection of links between input variables that other methodologies, such as logistic regression, may not be able to detect. Accordingly, a neural network model may be capable of modeling complex relationships between the target variables and predictor variables.

According to another example, the model constructor 214 may train a logistic regression model to predict the fail condition. The logistic regression model may be implemented for prediction of a binary variable. For example, a fail condition for a network node may be defined as a binary event (e.g., failed/not failed). Therefore, the logistic regression model may be trained to predict whether the network node will fail or not in the next 48 hours based on the set of input variables that have been selected. Logistic regression may measure the relationship between the fail condition and predictor variables using probability scores as the predicted values of the fail condition. That is, a trained logistic regression model may provide a probability that a network node may fail in next 48 hours. This probability score may be used to prioritize the network node maintenance schedule, as discussed below. For predictive modeling, a stepwise logistic regression algorithm may be used at 99.9% significance level. The stepwise regression procedure may be used because it iteratively allows the predictive model to add significant variables. For example, the top 7 variables that were input into the predictive model may be selected, as shown in TABLE 1 below. The example significant variables in TABLE 1 may be defined based on performance metrics available in the past 48 hours.

TABLE 1

| S No | Variable | Description |
|---|---|---|
| 1 | No of Installs_LAG2 | Installs from previous day. |
| 2 | IVR_TOTAL_LAG2 | Total No of IVR calls about set top boxes/modem/phone. |
| 3 | Signal Alarm Cable counts_LAG2 | (MAX) Signal alarm cable counts. The number of set top boxes that show signal alarms. |
| 4 | Upstream Signal to Noise ratio_LAG2_33_35 | Average upstream signal to noise ratio for the node. This variable takes value 1 if it is between 33 and 35. Else 0. |
| 5 | Technician ticket open LAG2 | Open field technician Orders (72 Hours). The number of field technician orders that were opened on the in the last 72 hours and still show as open in the billing system. This may represent the pending trouble calls. |
| 6 | Min Average FDC_LAG2 | (MIN) Average forward data channel level for the network node as polled from unified for cable modems. Field will show the most recently polled data from unified. Unified polls the devices every two hours. The network node health tool may update at 15 minute intervals. |
| 7 | Num Phone Device_LAG2 | Number of phone devices. |

At block 460, the model constructor 214, for instance, may validate each of the plurality of trained predictive models using a validation set from the extracted performance metrics. That is, the performance of the trained predictive models may be compared on the training set and the validation set. If the performance of a trained predictive model does not deteriorate on the validation set as compared to training set, then the trained predictive model may be considered stable. For example, the performance of a trained neural network model may be measured in terms of area under curve (AUC) of the receiver operating characteristic (ROC) and the performance of the trained logistic regression model may be measured using Kolmogorov-Smirno (KS) test and the AUC of ROC. If the trained predictive model is not validated, then the method 400 may return to block 440 to retrain the predictive model on another partitioned training set.

On the other hand, if the trained predictive model is validated, the validated predictive model may be in consideration to be selected as the "best" predictive model to predict the fail condition for a network node. The forecasting engine 216, for instance, may rate each of the validated models according to predefined criteria. The predefined criteria may include at least one of a predictive accuracy of the validated model, an interpretability of output for the validated model, an efficiency of the validated model, a stability and robustness of the validated model, a scalability of the validated model, and a lift of the validated model.

A lift of the validated model, for example, may be a calculation of a business benefit of the validated model. Referring back to FIG. 6, the lift for the trained decision tree model may be calculated as follows:

% population of broken-lined tree nodes: 16.6%
% of total network nodes with fail conditions covered: 31%
Lift=(31%−16.6%)/16.6%=88%.

Accordingly, a lift of 88% would mean that the costs for visiting the network nodes to identify and service the 31% of the total network nodes with a fail condition may be reduced to almost half of what it would cost if done without using the trained decision tree model.

For a neural network model, a whole population of network nodes in a network infrastructure may be divided into bins (e.g., 10 bins that are 10 percentile each) based on a predicted likelihood of the fail condition for each of the network nodes. Accordingly, the network nodes in the top few bins may be prioritized for maintenance as these network nodes are more likely to fail as compared to other network nodes. The lift for the trained neural network model may be calculated as follows:

% of total population selected=20%
% of total network nodes with a fail condition that can be captured without using the predictive model=20%
% of total network nodes with a fail condition that can be captured based on rank ordering by the predictive model=38%
Lift=(38%−20%)/20%=90%

Accordingly, a lift of 90% would mean that the costs for visiting the network nodes to identify and service the 38% of the total network nodes with a fail condition may be reduced to almost half of what it would cost if done without using the trained neural network model.

Similarly, for a logistic regression model, the whole population of network nodes in a network infrastructure may be divided into bins (e.g., 5 bins that are 5 percentile each) based on a predicted likelihood of the fail condition for each of the network nodes, as shown in TABLE 2 below. Accordingly, the network nodes in the top four bins (e.g., the top 20%) may be prioritized for maintenance as these network nodes are more likely to fail as compared to other network nodes.

TABLE 2

| Pctl | Failure Rate | % of total network nodes with a fail condition captured |
|---|---|---|
| 5 | 5% | 12% |
| 10 | 4% | 22% |
| 15 | 4% | 30% |
| 20 | 3% | 38% |
| 25 | 3% | 45% |
| 30 | 3% | 52% |
| 35 | 3% | 57% |
| 40 | 2% | 63% |

TABLE 2-continued

| Pctl | Failure Rate | % of total network nodes with a fail condition captured |
|---|---|---|
| 45 | 2% | 68% |
| 50 | 1% | 71% |
| 55 | 2% | 75% |
| 60 | 2% | 79% |
| 65 | 2% | 83% |
| 70 | 1% | 86% |
| 75 | 1% | 89% |
| 80 | 1% | 92% |
| 85 | 1% | 94% |
| 90 | 1% | 97% |
| 95 | 1% | 99% |
| 100 | 1% | 100% |

The lift for the trained logistic regression model may be calculated as follows:

% of total population of network nodes selected=20%

% of total network nodes with a fail condition that can be captured without using the predictive model=20%

% of total network nodes with a fail condition that can be captured based on rank ordering by the predictive model=38%

Lift=(38%−20%)/20%=90%

Accordingly, a lift of 90% would mean that the costs for visiting the network nodes to identify and service the 38% of the total network nodes with a fail condition may be reduced to almost half of what it would cost if done without using the trained logistic regression model.

As shown in block 470, the forecasting engine 216, for instance, may select and implement the highest rated model of the validated models to predict the fail condition for the network nodes. For example, the forecasting engine 216 may select as the "best" predictive model according to predefined criteria that may include at least one of a predictive accuracy of the validated model, an interpretability of output for the validated model, an efficiency of the validated model, a stability and robustness of the validated model, a scalability of the validated model, and a lift of the validated model as discussed above. The forecasting engine 216 may then prioritize a maintenance schedule for the network nodes based on the predicted likelihood of the fail condition for each of the network nodes. According to an example, the selected predictive model may predict the fail condition for a network node least 48 hours prior to the actual fail condition for the network node.

Figure 7:
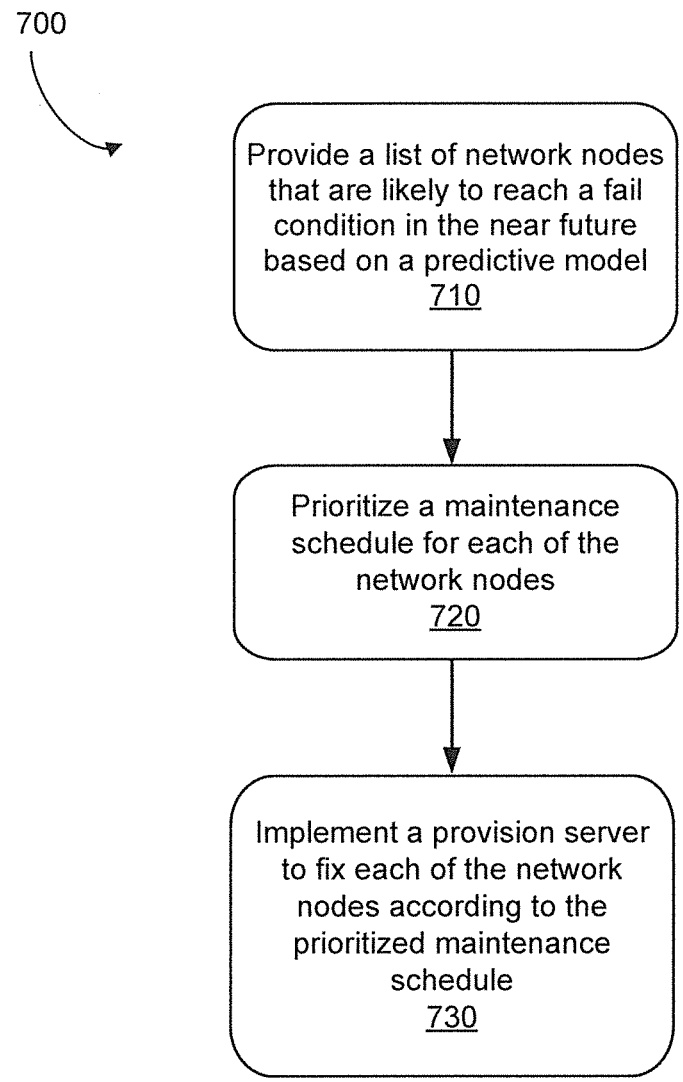
FIG. 7 shows a flow chart of predictive maintenance method, according to an example of the present disclosure.

With reference to FIG. 7, there is shown a flow diagram of predictive maintenance method 700, according to an example of the present disclosure. It should be apparent to those of ordinary skill in the art that method 700 represents a generalized illustration and that other operations may be added or existing operations may be removed, modified or rearranged without departing from the scope of method 700. The method 700 is implemented, for example, by the processor 202 of the predictive analytics server 110 as depicted in FIG. 2A.

At block 710, the forecasting engine 216 of the predictive analytics server 110, for instance, may provide a list of network nodes that are likely to reach a fail condition in the near future (e.g., at least 48 hours in advance) based on a predictive model (e.g., the highest rated predictive model selected in block 470 of FIG. 4). At block 720, the forecasting engine 216 may prioritize a maintenance schedule for each of the network nodes. Accordingly, at block 730, the forecasting engine 216 may implement the provisioning server 115 to remotely configure the network nodes that are likely to reach the fail condition in the near future according to the prioritized maintenance schedule. Alternatively, the forecasting engine 216 may dispatch an available field technician to fix each of the network nodes according to the prioritized maintenance schedule. Hence, method 700 may reduce the costs of visits to the network node, as well as reduce the time lag between a fail condition and resolving the fail condition. This may lead to an improvement in the customer experience.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A system for predicting network node failure, the system comprising:
   a network infrastructure comprising a set of network nodes that provide voice and data services over a network to customer premises;
   a predictive analytics server comprising a controller and machine readable instructions in a data repository to implement
      a performance extractor to aggregate performance metrics for the network nodes in the network infrastructure, wherein the performance metrics are aggregated from a plurality of data sources;
      a model constructor to
         identify input variables related to a fail condition for the network nodes,
         train a plurality of models to predict the fail condition for the network nodes using a training set from the extracted performance metrics, wherein each of the plurality of models is fit with at least one of the identified input variables, and
         validate each of the plurality of trained models using a validation set from the extracted performance metrics; and
      a forecasting engine to
         define the fail condition for the network nodes,
         rate each of the validated models according to predefined criteria, and
         implement a highest rated model of the validated models to predict the fail condition for the network nodes; and
   a provisioning server to configure parameters for the network nodes in the network infrastructure according to the prediction of the fail condition to deploy services to maintain the network nodes.

2. The system according to claim 1, wherein the forecasting engine is to prioritize a maintenance schedule for the network nodes in the network infrastructure based on a predicted likelihood of the fail condition for each of the network nodes, the predictions being inputted from the highest rated model at least 48 hours prior to the fail condition for a selected network node.

3. The system according to claim 1, wherein the performance extractor is to aggregate performance metrics from a predetermined time frame at least 48 hours prior to the fail condition for a selected network node.

4. The system according to claim 1, wherein to aggregate the performance metrics for the network nodes, the performance extractor is to aggregate performance metrics including at least one of telemetry data, customer data, call interaction data, and field technician data.

5. The system according to claim 1, wherein the performance extractor is to:
   detect the occurrence of the fail condition for the network nodes;
   flag each day that the fail condition is detected for at least one of the network nodes; and
   remove a flag for each flagged day that is consecutive to a first flagged day.

6. The system according to claim 1, wherein to identify input variables related to the fail condition, the model constructor is to:
   derive variables from the extracted performance metrics; and
   implement a clustering algorithm to select a number of ranked variables, wherein the clustering algorithm ranks the variables according to predefined criteria.

7. The system according to claim 1, wherein the model constructor is to partition the extracted performance metrics into a training set for training the plurality of models and a validation set that is not used for training the plurality of models, wherein the extracted performance metrics are partitioned using a random sampling algorithm.

8. The system according to claim 1, wherein the plurality of models includes a decision tree model, a neural network model, and a logistic regression model.

9. The system according to claim 1, wherein the forecasting engine is to rate each of the plurality of validated models according to predefined criteria including at least one of a predictive accuracy of each of the validated models, an interpretability of an output of each of the validated models, an efficiency of each of the validated models, a stability and robustness of each of the validated models, a scalability of each of the validated models, and a lift of each of the validated models.

10. A method for predicting failure of network nodes in a network infrastructure, the method comprising:
    extracting, by a controller of a predictive analytics server, performance metrics for the network nodes from a plurality of data sources;
    defining a fail condition for the network nodes;
    identifying input variables related to the fail condition for the network nodes, the input variables being derived from the extracted performance metrics;
    training a plurality of models to predict the fail condition for the network nodes using a training set from the extracted performance metrics, wherein each of the plurality of models is fit with at least one of the identified input variables;
    validating each of the plurality of trained models using a validation set from the extracted performance metrics, wherein the validating includes rating each of the validated models according to predefined criteria; and
    selecting a highest rated model of the validated models to predict the fail condition for the network nodes.

11. The method according to claim 10, comprising:
    prioritizing a maintenance schedule for the network nodes in the network infrastructure based on a predicted likelihood of the fail condition for each of the network nodes,
    wherein the predicted likelihood of the fail condition is inputted from the highest rated model at least 48 hours prior to the fail condition for a selected network node.

12. The method according to claim 10, wherein extracting the performance metrics comprises extracting performance metrics from a predetermined time frame at least 48 hours prior to the fail condition for a selected network node.

13. The method according to claim 10, wherein extracting the performance metrics include at least one of telemetry data, customer data, call interaction data, and field technician data.

14. The method according to claim 10, wherein defining the fail condition comprises:
    detecting the occurrence of the fail condition for the network nodes;
    flagging each day that the fail condition is detected for at least one of the network nodes; and
    removing a flag for each flagged day that is consecutive to a first flagged day.

15. The method according to claim 10, wherein identifying input variables related to the fail condition comprises:
    deriving variables from the extracted performance metrics; and
    implementing a clustering algorithm to select a number of ranked variables, wherein the clustering algorithm ranks the variables according to predefined criteria.

16. The method according to claim 10, wherein training the plurality of models to predict the fail condition comprises training a decision tree model, a neural network model, and a logistic regression model.

17. The method according to claim 10, the predefined criteria includes at least one of a predictive accuracy of each of the validated models, an interpretability of an output of each of the validated models, an efficiency of each of the validated models, a stability and robustness of each of the validated models, a scalability of each of the validated models, and a lift of each of the validated models.

18. A non-transitory computer readable medium on which is stored machine readable instructions to predict failure in network nodes of a network infrastructure, the machine readable instructions executable by a controller to:
    extract performance metrics for the network nodes from a plurality of data sources, wherein the extracted performance metrics include at one of telemetry data, customer data, call interaction data, and field technician data;
    define a fail condition for the network nodes;
    identify input variables related to the fail condition for the network nodes, the input variables being derived from the extracted performance metrics;
    train a plurality of models to predict the fail condition for the network nodes using a training set from the extracted performance metrics, wherein each of the plurality of models is fit with at least one of the identified input variables;
    validate each of the plurality of trained models using a validation set from the extracted performance metrics, wherein the validating includes rating each of the validated models according to predefined criteria;
    select a highest rated model of the validated models to predict the fail condition for the network nodes; and
    prioritize a maintenance schedule for the network nodes based on a predicted likelihood of the fail condition for each of the network nodes.

19. The non-transitory computer readable medium of claim 18, wherein to define the fail condition, the machine readable instructions are further executable by the processor to:
    detect the occurrence of the fail condition for the network nodes;
    flag each day that the fail condition is detected for at least one of the network nodes; and remove a flag for each flagged day that is consecutive to a first flagged day.

20. The non-transitory computer readable medium of claim 18, wherein to train the plurality of models to predict the fail condition, the machine readable instructions are further executable by the processor to train a decision tree model, a neural network model, and a logistic regression model.

* * * * *